(12) United States Patent
Clark et al.

(10) Patent No.: US 7,860,977 B2
(45) Date of Patent: Dec. 28, 2010

(54) DATA COMMUNICATION SYSTEM AND METHOD

(75) Inventors: Andrew Robert Clark, Burton upon Trent (GB); Robert Arnold Prole, Brighton (GB)

(73) Assignee: Barron McCann Technology Limited, Hertfordshire (GB)

( * ) Notice: Subject to any disclaimer, the term of this patent is extended or adjusted under 35 U.S.C. 154(b) by 0 days.

(21) Appl. No.: 10/537,933

(22) PCT Filed: Dec. 8, 2003

(86) PCT No.: PCT/GB03/05345

§ 371 (c)(1),
(2), (4) Date: Jun. 28, 2006

(87) PCT Pub. No.: WO2004/054200

PCT Pub. Date: Jun. 24, 2004

(65) Prior Publication Data

US 2006/0253603 A1    Nov. 9, 2006

(30) Foreign Application Priority Data

Dec. 9, 2002   (GB) ................................. 0228713.4

(51) Int. Cl.
*H04Q 7/20* (2006.01)
(52) U.S. Cl. ........................ 709/227; 709/228; 709/203; 709/229; 709/204; 455/426.1; 455/426.2; 455/466
(58) Field of Classification Search ................. 709/227, 709/228, 229, 327, 203, 204, 218, 219; 455/466, 455/410, 411, 422, 445, 414.1–414.4, 426.1, 455/426.2
See application file for complete search history.

(56) References Cited

U.S. PATENT DOCUMENTS

| | | | | |
|---|---|---|---|---|
| 6,134,591 A * | 10/2000 | Nickles | .................... | 709/229 |
| 6,269,099 B1 * | 7/2001 | Borella et al. | .............. | 370/389 |
| 7,149,817 B2 * | 12/2006 | Pettey | ...................... | 709/250 |
| 7,165,112 B2 * | 1/2007 | Battin et al. | ................ | 709/230 |
| 2001/0042200 A1 | 11/2001 | Lamberton et al. | | |
| 2002/0073322 A1 * | 6/2002 | Park et al. | ................... | 713/188 |
| 2003/0014544 A1 * | 1/2003 | Pettey | ...................... | 709/249 |
| 2004/0243712 A1 * | 12/2004 | Sakai et al. | ................. | 709/227 |
| 2005/0086349 A1 * | 4/2005 | Subramaniyan | ............ | 709/230 |
| 2005/0125539 A1 * | 6/2005 | Tripathi | .................... | 709/227 |

OTHER PUBLICATIONS

T. Aura, P. Nikander, and J. Leiwo; "Dos-Resistant Authentication with Client Puzzles"; Proc. Security Protocols Workshop 2000; Springer-Verlag, 'Online! 2000, pp. 170-177, XP002275098.
Stevens, W.R.; "TCP/IP Illustrated, vol. 1. The Protocols"; 1994, TCP/IP Illustrated. vol. 1: The Protocols, Professional Computing Series, Reading, MA; Addison Wesley, US. vol. 1, pp. 229-233, 240-243, XP002275099.
Schuba C L et al; "Analysis of a denial of service attack on TCP"; Security And Privacy, 1997. Proceedings, 1997 IEEE Symposium In Oakland, CA, USA, May 4-7, 1997, Los Alamitos, CA, USA, IEEE Comput. Soc, US., pp. 208-223, XP010230160.

* cited by examiner

*Primary Examiner*—Keith T Ferguson
(74) *Attorney, Agent, or Firm*—Leason Ellis LLP

(57) ABSTRACT

A transmission control protocol (TCP) is used for data communications, yet in order to provide security against denial of service attacks and the like, a connection negotiation phase is required before the TCP handshake. Without a successful connection negotiation, a TCP handshake is unable to complete thereby preventing connection.

25 Claims, 5 Drawing Sheets

DATA COMMUNICATION SYSTEM AND METHOD

CROSS REFERENCE TO PRIOR APPLICATION

This is a U.S. national phase application under 35 U.S.C. §371 of International Patent Application No. PCT/GB2003/005345, filed Dec. 8, 2003, and claims benefit of Great Britain Patent Application No. 0228713.4, filed Dec. 9, 2002. The International Application was published in English on Jun. 24, 2004 as WO 2004/054200 A2 under PCT Article 21(2).

FIELD OF THE INVENTION

The present invention relates to a system and method for securing data communications over a network and is particularly relevant to networks using the Transmission Control Protocol (TCP).

BACKGROUND TO THE INVENTION

In data communications, Internet Protocol (IP) networks have become pervasive. In particular, the majority of public data communications networks, particularly the Internet, use IP. Given the availability of cheap, high speed, access to public data communications networks using DSL connections or similar, many organisations wish to use these networks to provide interconnectivity between trusted areas or devices. The trusted devices may be located, for example at branch offices or homes. Trusted areas would include networks within corporate offices.

However, by connecting trusted areas and devices to public networks, they become open to attack and abuse. This means that organisations are forced to take defensive measures against attack.

The Transmission Control Protocol is the most common, reliable and popular protocol used in IP networks to control connection establishment and transfer. In addition, TCP/IP is the protocol most Microsoft Windows® systems use to access networks. Unfortunately, it is well known that existing session establishment for TCP over IP networks is inherently insecure and prone to exploitation by Active and Intrusion attacks.

It is easy for an attacker on an IP network to determine those TCP/IP services present using simple techniques and/or software. Once the TCP/IP services are detected, it is often easy to exploit and/or attack them. For example, denial of service attacks are possible.

Denial of service (DoS) attacks cost businesses millions of dollars each year and are now a serious threat to any system or network connected to a public network. These costs are related to system downtime, lost revenues and the labour involved in identifying and reacting to such attacks. Essentially, a DoS attack disrupts or completely denies services to legitimate users, networks, systems or other resources. The intent of such attacks is usually malicious and often takes little skill or resources because the requisite tools are readily available.

In the case of TCP/IP, attacks normally focus on the way systems handle handshaking and connection initiation. FIG. 1 is a schematic diagram of a data communications system using the normal 3-way handshaking used in TCP to process connection requests.

A SYN packet is sent from a specific port on a source 10 to the same port at a destination 20. Upon receipt of the SYN packet, the destination 20 then sends an SYN/ACK packet to the source 10. Upon receipt of the SYN/ACK packet, the source 10 then sends an ACK packet to the destination 20 and the connection is then considered established (also referred to as open). Data can then be communicated between the source 10 and destination 20.

The packets discussed above have a predetermined format, as is defined in RFC0793 available from ftp://ftp.rfc-editor.org/in-notes/rfc793.txt, and is incorporated herein by reference.

One such DoS attack is referred to as an SYN flood attack. While the standard 3-way handshake works well most of the time, most systems have only a finite number of resources available for setting up connections and potential. While most systems can sustain hundreds of concurrent connections to a specific port, it may only take a dozen or so potential connection requests to exhaust all resources allocated to setting up connections. It is this weakness that attackers use to disable a system.

When a SYN flood attack is initiated, attackers send a SYN packet from a source to a destination, as is normal in the handshaking procedure. However, the attackers commonly spoof the source address, selecting an address that does not exist. When the destination tries to send the SYN/ACK packet to the spoofed address, it receives no response. Typically, the destination system places each pending connection request in a connection queue to await the ACK packet. In the case of a SYN flood attack, the ACK packet never arrives. The resources allocated for the spoofed request will only be released when a timer associated with the connection queue expires. In standard configurations of systems, timer settings vary from 75 seconds up to as much as 23 minutes or more and the size of the connection queue is often very small. Thus, attackers only need to send a small number of SYN packets to completely disable a specific port. The system under attack will never be able to clear the queue before receiving new SYN requests.

Various mechanisms have been employed to counter such attacks, such as implementing firewalls or other ways of blocking some or all ports. However, if a TCP/IP system is to communicate successfully with another at least one port must be left open and this in itself creates a vulnerability when the connection is over a public network.

SUMMARY OF THE INVENTION

According to an aspect of the present invention, there is provided a communication system arranged to communicate under the Transmission Control Protocol (TCP), the system being arranged to not accept a TCP connection request unless a connection has already been negotiated.

Preferably the connection is negotiated by receipt at the communication system of a connection request message.

Preferably the request message comprises a datagram.

Preferably, the datagram includes data on the connection requested and/or information on the source.

Preferably, negotiation includes evaluation of the request message.

Preferably the evaluation includes processing the data on the connection requested and/or the information on the source. Most preferably, the evaluation includes authenticating the source.

The evaluation may include satisfactory authentication of the source and/or negotiation of an encryption key.

According to another embodiment of the present invention, there is provided a further communication system arranged to communicate using TCP with the communication system of any of the preceding claims, the further communication system being arranged to negotiate a connection with the communication system prior to transmitting a TCP connection request.

Dependant on the network infrastructure in place the received datagram may be responded to with a further datagram, this is desirable when the intervening network is not able to allow the responding end to successfully send a TCP SYN. The effect of this further datagram is to cause the initiating party to send a TCP SYN in response to the responding datagram. In some circumstances the 'requesting' datagram may result in a 'responding' datagram which is not a TCP SYN.

The or each communication system may comprise a computer network communication protocol stack, computer system or network communications device such as a router, bridge, gateway, firewall or switch.

According to another embodiment of the present invention, there is provided a data communications method for communicating using the Transmission Control Protocol (TCP) comprising: requiring a connection negotiation with a source system to be completed prior to acceptance of TCP communication packets from the source system.

According to a further embodiment of the present invention, there is provided a data communications connection method for the Transmission Control Protocol (TCP) comprising the steps of:

prior to the establishment of a TCP/IP connection the initiating party sending a connection request message to a receiving party;

receiving the connection request message at the receiving party;

opening a TCP connection at the receiving party for the initiating party, and, communicating between the initiating and receiving parties using TCP communications.

The present invention seeks to provide a data communications method and system in which the transmission control protocol (TCP) is used for data communications. In order to provide security against denial of service attacks and the like, a connection negotiation phase is required before the TCP handshake. Without a successful connection negotiation, a TCP handshake is unable to complete thereby preventing connection.

The present invention seeks to provide a solution for protecting against these attacks whilst at the same time providing a scalable and flexible method for exchanging data securely over Public IP networks using TCP connections. In particular the use of specific datagrams for session establishment provides for the end-point devices, initiator and receiver, to be invisible to attackers on the Public IP infrastructure. TCP is chosen as a reliable data carrier over IP networks.

The present invention can be implemented in a manner that is transparent in operation to users and can be implemented in any system or device using any version of the TCP stack. The present invention would also be applicable to other TCP like protocol stacks.

BRIEF DESCRIPTION OF THE DRAWINGS

Examples of the present invention will now be described in detail, by way of example only, with reference to the accompanying drawings in which.

DETAILED DESCRIPTION

Figure 2:
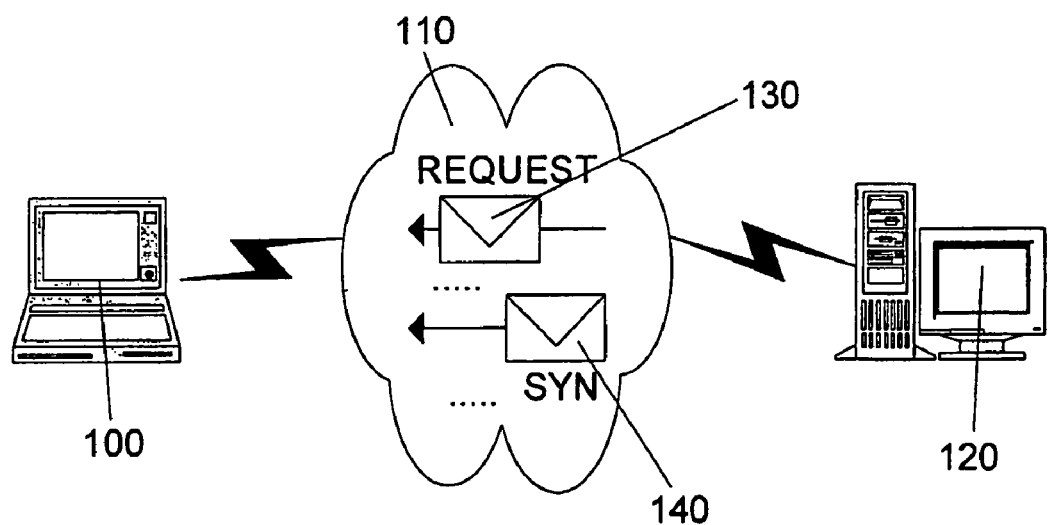
FIG. 2 is a schematic diagram of a data communications system according to a first embodiment of the present invention.

FIG. 2 is a schematic diagram of a data communications system according to a first embodiment of the present invention.

A first communication system 100 is connected to an insecure network 110 and communicates using TCP. However, the first communication system 100 is configured to not acknowledge, reply or otherwise give away its existence to new incoming TCP traffic. As described with reference to FIG. 1, in a standard TCP communication system if a connection request is received in the form of a SYN TCP packet, the communication system would give away its existence by replying. In the present embodiment, upon receipt of such a SYN packet (or indeed any other unexpected packet type), the first communication system 100 does nothing. Preferably, the first communication system 100 discards such packets. Thus, potential attackers are not able to implement DoS attacks and the like.

In order to establish a connection with the first communication system 100, a second communication system 120 must send a connection request message 130 of a predetermined format before sending the standard TCP SYN packet 140 to initiate the handshake. Preferably, a predetermined delay is applied by the second communication system 120 before sending the SYN packet 140 in order for the connection request message to be received and processed at the first communication system 100.

Upon receipt of the connection request message 130, the first communication system 100 examines it for validity and, if the request message 130 is found to be valid then the first communication system opens a TCP/IP connection to the second communication system 120. Upon receipt of the TCP SYN packet 140 from the second communication system, the standard TCP handshake continues, as is illustrated with reference to FIG. 1.

Figure 3:
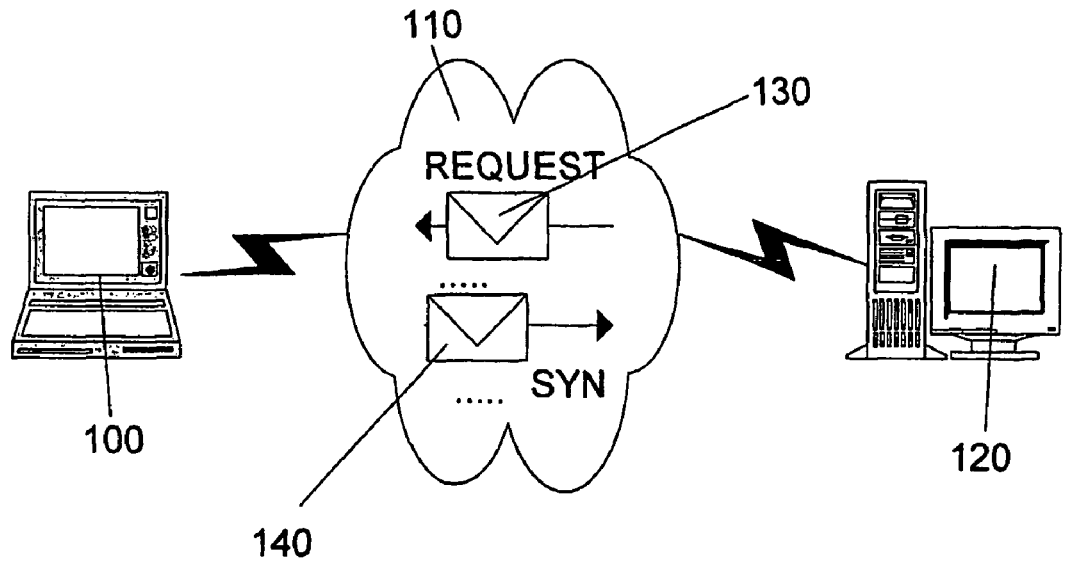
FIG. 3 is a schematic diagram of a data communications system according to a second embodiment of the present invention.

FIG. 3 is a schematic diagram of a data communications system according to a second embodiment of the present invention.

Figure 1:
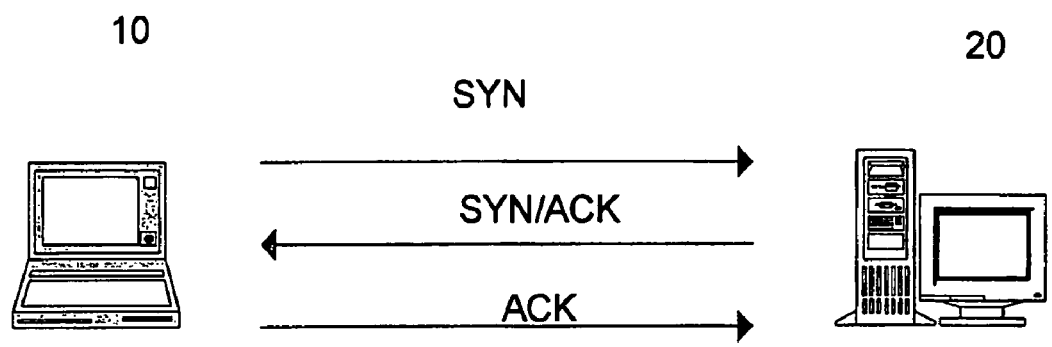
FIG. 1 is a schematic diagram of a data communications system using the normal 3-way handshaking used in TCP to process connection requests.

The second embodiment operates in a similar manner to the first embodiment, as discussed with reference to FIG. 1. However, instead of it being reliant on the second communication system 120 to follow the connection request message 130 with a TCP SYN packet 140, the first communication system 100 instead instigates the handshake by sending the SYN packet 140 upon receipt of a valid connection request message 130.

Figure 4:
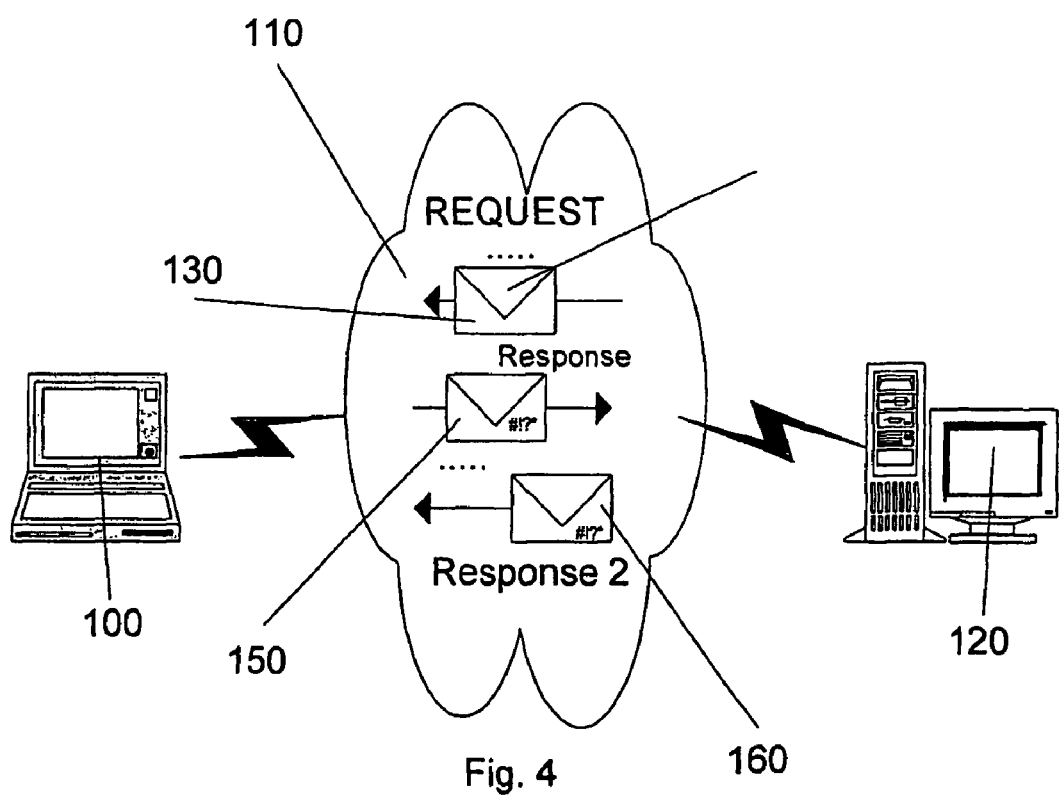
FIG. 4 is a schematic diagram of a third embodiment of the present invention.

FIG. 4 is a schematic diagram of a third embodiment of the present invention.

In this embodiment, the first communication system 100 is configured to require more than a valid connection request message 130 of a predetermined format to permit a connection. The connection request message 130 is preferably used by the second communication system 120 to transmit data content that is examined by the first communication system 100 to authenticate the first communication system 120. Authentication may, for example be dependent on the first communication system 120 providing one of a number of approved identities, network addresses, passwords or other authentication data. Alternatively, or in addition, authentication may include the first communication system sending a response message 150 to the address of the second communication system 120, which the second communication system 120 must reply to in a further response message 160. In this example, the response message may include a code that must be included in the response message 160 of the second communication system 120 in order for the network address of the second communication system 120 to be confirmed.

In addition, or as an alternative, the authentication may require successful negotiation of an encryption key between the first communication system 100 and the second communication system 120.

Depending on the configuration it may require only one or a predetermined number of the authentication requirements be failed by the second communication system 120 for the connection request to be discarded by the first communication system 100.

Figure 5:
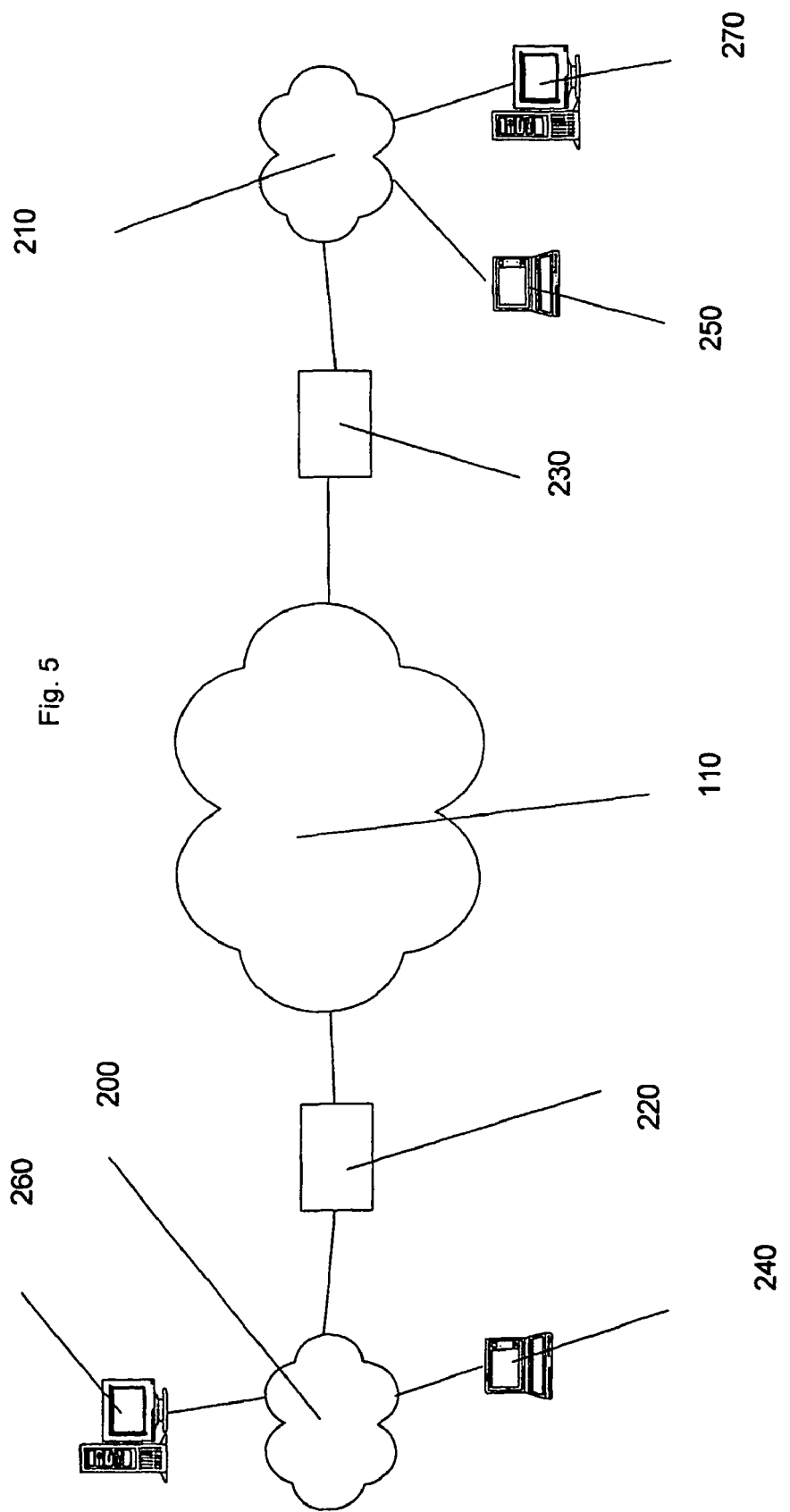
FIG. 5 illustrates a datagram format suitable for use in the embodiments of FIGS. 2, 3 and 4; and, FIG. 6 is a flow diagram of a data communication method according to an embodiment of the present invention.

FIG. 5 is a schematic diagram of a fourth embodiment of the present invention.

In order to protect trusted networks 200, 210 from the untrusted network 110, communication systems as discussed above with reference to FIGS. 2 to 4 are placed at the boundary of the trusted networks 200, 210. The communication systems in the embodiments discussed with reference to FIGS. 2 to 4 have been illustrated as Client or server computer terminals, such as a Windows PCs. However, as the present invention could be implemented as an addition to a TCP protocol stack, it could be included within any TCP enabled device that is directly connected to the untrusted network 110.

In the embodiment of FIG. 5, the present invention is implemented in a gateway device 220, 230 connecting the two trusted network 200, 210 to the untrusted network. Client computers 240, 250 and server computers 260, 270 are connected to the respective gateway device 220, 230 via their respective trusted network 200, 210.

In this example, if client computer 240 wishes to connect to server computer 270, the client computer 240 sends a TCP SYN packet to the server computer 270 in accordance with the standard TCP handshake. However, when the packet reaches the gateway device 220, it is intercepted by the gateway device 220 and held in a queue. A connection request message is then sent from gateway device 220 to gateway device 230 and is processed in the same manner as has been discussed with reference to FIGS. 2 to 4. Once the connection has been granted, the TCP SYN packet is passed from the queue, over the untrusted network 110 to the server computer 270 (via gateway device 230 and network 210). Obviously if the embodiment of FIG. 3 were being used, the TCP stack at the client computer 240 and server computer 270 would have to be changed to cope with the SYN request from the client computer 240 being dropped in place of one from the server computer 240.

The gateway device 220 may be a router, bridge, switch, firewall or other network device or system. In addition, one communication device may be a gateway device as discussed above whilst another may be in the form of software on a computer system.

In some network topologies (such as those using gateways above), the intervening network device will change the end point address for the connection. In these circumstances it is necessary to either have datagrams exchanged in both directions prior to the establishment of a TCP connection, or for the originating party to send a datagram and to follow this directly with an opening TCP packet (ie. a SYN packet). The receiving gateway may respond with its own address and include additional information such as ECHO options into the responding SYN packet.

Receiving devices would await incoming datagrams requesting connections these could contain a payload which offers authentication of the requesting device. The responding device can process these requests as system resources allow, although this may be accelerated by the use of specific hardware devices. Once the responding device evaluates a requesting datagram as acceptable it will attempt to open a TCP connection to the initiating device.

Figure 6:
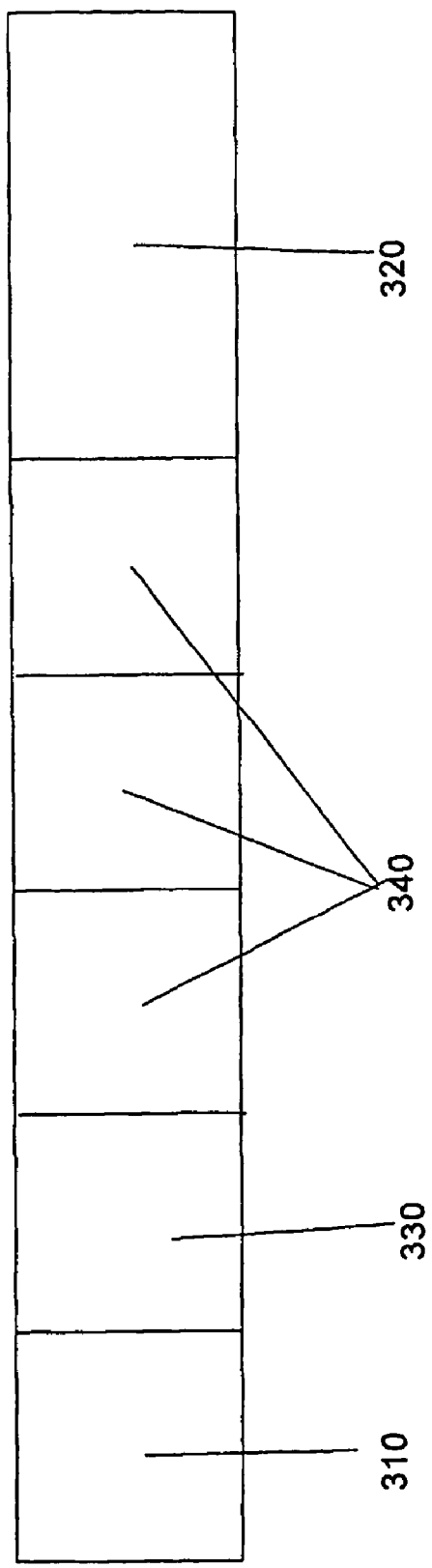

FIG. 6 illustrates a request message format suitable for use in the embodiments of FIGS. 2, 3, 4 and 5.

The format of the request message will be dependent on the addressing protocol used by the network 110. In the case of an IP network, an IP datagram could be used and this is illustrated in FIG. 6.

Irrespective of the addressing protocol, the request message 300 will at least contain a destination address 310 and a payload 320. The destination address 310 is needed for the datagram to be delivered by the network 110 to its destination whilst the payload 320 is needed in order that the request message 300 can be differentiated from other traffic the destination may receive.

Preferably, the request message 300 also includes an address 330 of the source sending the request. It may also include one or more fields 340 indicating the type and/or position of data in the payload 320, such as request, authentication information, encryption information. Other fields such as checksums, time-to-live, length and version identifiers may also be included.

Preferably, the request message is a datagram, that is, a self-contained packet of information that is sent through a network with a minimum protocol overhead. It is preferred that the connection request message is not a TCP packet to avoid confusion and also to make implementation simpler. However, implementations can be envisaged, including the use of a standard TCP packet format for the request message.

Figure 7:
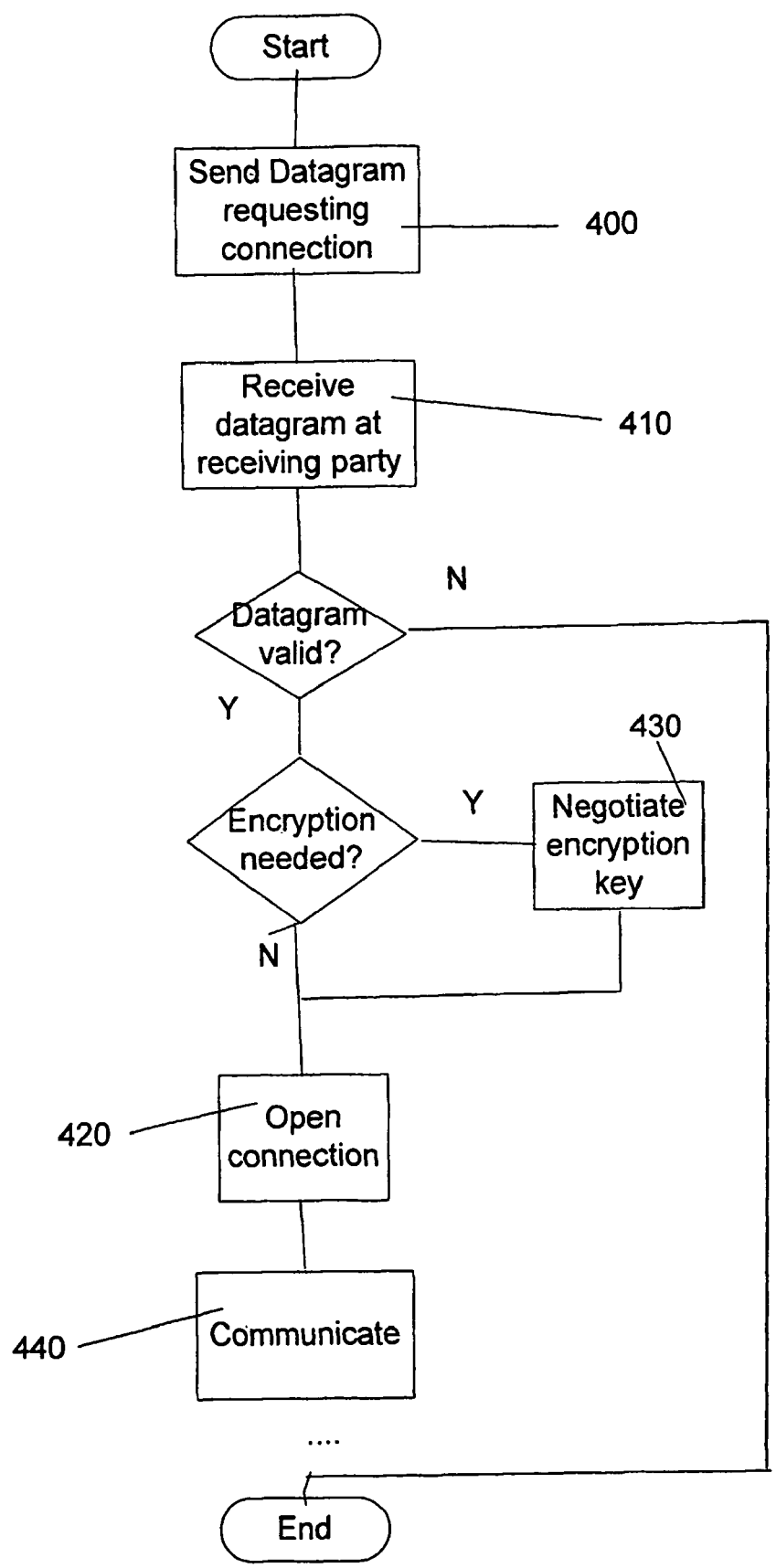
FIG. 7 is a flow diagram of a data communication method according to an embodiment of the present invention.

FIG. 7 is a flow diagram of a data communication method according to an embodiment of the present invention.

In step 400, Prior to the establishment of a TCP/IP connection the initiating party will send a datagram to the receiving device requesting a connection be initiated by the receiving party to the initiating party.

The datagram may optionally contain data content which can be examined by the receiving party to authenticate the initiating party.

Following receipt of the datagram in step 410, the receiving party will open a TCP connection in step 420 to the initiating party, and optionally, in step 430 negotiate a payload encryption key. It would be during the opening of the TCP connection and encryption key establishment for the end devices to authenticate each other.

Once opened successfully both entities can use the TCP/IP connection to communicate in step 440. The option exists to incorporate TCP payload encryption at this point to ensure the data being transferred is secure and will remain confidential.

Where authentication and encryption have been discussed, it will be apparent that many known authentication and cryptographic techniques could be used to establish the encryption key and detailed party authentication. Furthermore, although the emphasis of the present invention is on securing TCP based communication systems on publicly accessible data networks, it will be apparent that the systems and methods disclosed are equally applicable to non-public data networks.

Although the description has referred to Internet Protocol (IP) networks and using TCP over IP networks at various points, it will be apparent that the present invention is applicable for use over other network types as long as they support TCP.

The invention claimed is:

1. A data communications connection method for the Transmission Control Protocol (TCP) comprising the steps of:

prior to the transmission of a SYN handshake packet to initiate a 3-way handshake for a TCP/IP connection, an initiating party computer system sending a connection request message to a receiving party computer system;

receiving the connection request message at the receiving party computer system;

transmitting the SYN handshake packet to initiate a 3-way handshake for a TCP/IP connection from the initiating party computer to the receiving party computer;

opening, upon receipt of the connection request message and the handshake packet, a TCP connection at the receiving party computer system for the initiating party computer system; and communicating between the initiating and receiving party computer systems using TCP communication packets.

2. A data communications connection method according to claim 1, wherein the connection request message includes data on the connection requested.

3. A data communications connection method according to claim 1, wherein the connection request message includes information on the initiating party computer system.

4. A data communications connection method according to claim 1, further comprising:

evaluating the connection request message at the receiving party computer system prior to opening the TCP connection.

5. A data communications connection method according to claim 4, wherein evaluating the connection request message includes authenticating data within the connection request message.

6. A data communications connection method according to claim 4, wherein evaluating the connection request message includes authenticating the initiating party computer system.

7. A data communications connection method according to claim 4, further comprising negotiating an encryption key during evaluation.

8. The data communications connection method according to claim 1, wherein the request message is an IP datagram and wherein the step of opening the TCP connection requires negotiation of the connection request using the IP datagram before accepting any TCP connection request.

9. The data communications connection method according to claim 1, wherein the opening step is performed only upon receipt of the connection request message and the subsequent handshake packet.

10. The data communications connection method according to claim 9, wherein the request message is an IP datagram.

11. A communication connection system adapted to communicate under the Transmission Control Protocol (TCP), comprising:

an initiating device adapted to send a connection request message prior to the transmission of a SYN handshake packet to initiate a 3-way handshake for a TCP/IP connection and the subsequent transmission of the SYN handshake packet for the TCP/IP connection; and a receiving device adapted to receive the connection request message and subsequent SYN handshake packet, open the TCP connection at the receiving device for the initiating device, upon receipt of the connection request message and the subsequent SYN handshake packet, and communicate with the initiating device using TCP communication packets.

12. The communication connection system of claim 11, wherein the connection request message includes information on the initiating device.

13. The communication connection system of claim 11, wherein the receiving device is further adapted to evaluate the connection request message prior to opening the TCP connection at the receiving device for the initiating device.

14. The communication system of claim 13, wherein evaluating the connection request message includes authenticating data within the connection request message.

15. The communication connection system of claim 13, wherein evaluating the connection request message includes authenticating the initiating device.

16. The communication connection system of claim 13, wherein the receiving device is further adapted to negotiate an encryption key with the initiating device.

17. The communication connection system of claim 11, wherein the request message is an IP datagram and wherein the receiving device is further adapted to not accept a TCP connection request unless a connection has already been negotiating using the IP datagram.

18. The communication connection system of claim 11, wherein the receiving device is adapted to open the TCP/IP connection only upon receipt of the connection request message and the subsequent handshake packet.

19. A communication connection system adapted to communicate under a Transmission Control Protocol (TCP), comprising:

an initiating device adapted to send a connection request message prior to the transmission of a SYN handshake packet to initiate a 3-way handshake for a TCP/IP connection, the connection request message being an IP datagram;

a receiving device adapted to receive the connection request message, open the TCP connection at the receiving device for the initiating device upon receipt of the connection request message, and communicate with the initiating device using TCP communication packets.

20. The communication connection system of claim 19, wherein the connection request message includes information on the initiating device.

21. The communication connection system of claim 19, wherein the receiving device is further adapted to evaluate the connection request message prior to opening the TCP connection at the receiving device for the initiating device.

22. The communication connection system of claim 21, wherein evaluating the connection request message includes authenticating data within the connection request message.

23. The communication connection system of claim 21, wherein evaluating the connection request message includes authenticating the initiating device.

24. The communication connection system of claim 21, wherein the receiving device is further adapted to negotiate an encryption key with the initiating device.

25. The communication connection system of claim 19, wherein the receiving device is adapted to open the TCP/IP connection only upon receipt of the connection request message and only after negotiation of the connection request using the IP datagram.

* * * * *